United States Patent
Jaradi et al.

(10) Patent No.: US 12,296,785 B2
(45) Date of Patent: May 13, 2025

(54) SEATBELT ANCHOR MECHANISM

(71) Applicant: Ford Global Technologies, LLC, Dearborn, MI (US)

(72) Inventors: Dean M. Jaradi, Macomb, MI (US); S.M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/451,231

(22) Filed: Aug. 17, 2023

(65) Prior Publication Data
US 2025/0058737 A1   Feb. 20, 2025

(51) Int. Cl.
| | |
|---|---|
| *B60R 22/20* | (2006.01) |
| *B60N 2/00* | (2006.01) |
| *B60R 22/18* | (2006.01) |
| *B60R 22/26* | (2006.01) |
| *B60R 22/34* | (2006.01) |

(52) U.S. Cl.
CPC ............ *B60R 22/201* (2013.01); *B60N 2/002* (2013.01); *B60R 22/26* (2013.01); *B60R 22/34* (2013.01); *B60R 2022/1806* (2013.01); *B60R 2022/207* (2013.01); *B60R 2022/208* (2013.01)

(58) Field of Classification Search
CPC ......... B60R 22/03; B60R 22/20; B60R 22/26; B60R 22/201; B60R 2022/207; B60R 2022/208
See application file for complete search history.

(56) References Cited

U.S. PATENT DOCUMENTS

| | | | | |
|---|---|---|---|---|
| 4,496,170 A | * | 1/1985 | Sasaki | B60R 22/03 280/801.1 |
| 4,667,980 A | * | 5/1987 | Yamamoto | B60R 22/022 297/483 |
| 4,765,651 A | * | 8/1988 | Unger | B60R 22/023 74/89.14 |
| 5,123,673 A | * | 6/1992 | Tame | B60R 22/26 280/808 |
| 5,624,136 A | | 4/1997 | McGlothlin et al. | |
| 6,308,986 B1 | * | 10/2001 | Townsend | B60R 22/03 280/808 |

(Continued)

FOREIGN PATENT DOCUMENTS

| | | |
|---|---|---|
| CN | 101428603 A | 5/2009 |
| CN | 210062918 U | 2/2020 |

(Continued)

*Primary Examiner* — Drew J Brown
(74) *Attorney, Agent, or Firm* — Frank A. MacKenzie; Brooks Kushman P.C.

(57) ABSTRACT

A seat system includes a seat having a seatback and a seat bottom extending in a seat-forward direction from the seatback. A seatbelt retractor is mounted to the seatback and an anchor is carried by the seat bottom and movable seat-rearward and seat-forward between a retracted position and an extended position. A seatbelt webbing extends from the seatbelt retractor and is attached to the anchor. An actuator is operatively coupled to the anchor to move the anchor between the retracted position and the extended position. A lock is operable to selectively retain the anchor in the retracted position.

11 Claims, 5 Drawing Sheets

(56) References Cited

U.S. PATENT DOCUMENTS

| | | | |
|---|---|---|---|
| 6,802,537 B1* | 10/2004 | Tolfsen | B60N 2/508 |
| | | | 280/805 |
| 6,935,700 B1 | 8/2005 | Nerette | |
| 10,081,330 B2 | 9/2018 | Arnold et al. | |
| 11,345,306 B1* | 5/2022 | Jaradi | B60R 22/3405 |
| 11,370,335 B1* | 6/2022 | Cabrera | B60N 2/2866 |
| 11,414,046 B1 | 8/2022 | Charopoulos et al. | |
| 2002/0167212 A1* | 11/2002 | Rogers, Jr. | B60R 22/03 |
| | | | 297/468 |
| 2006/0181073 A1* | 8/2006 | Sugiyama | B60R 22/03 |
| | | | 280/808 |
| 2006/0220426 A1* | 10/2006 | Moffatt | B60N 2/42736 |
| | | | 297/216.19 |
| 2007/0096450 A1* | 5/2007 | Gyllenspetz | B60R 22/03 |
| | | | 280/801.1 |
| 2008/0290644 A1* | 11/2008 | Spahn | B60R 22/03 |
| | | | 280/806 |
| 2009/0283994 A1* | 11/2009 | Ruthinowski | B60R 21/18 |
| | | | 280/805 |
| 2015/0217720 A1 | 8/2015 | Palaniappan et al. | |
| 2015/0232061 A1* | 8/2015 | Cuddihy | B60R 16/037 |
| | | | 701/45 |
| 2015/0307060 A1* | 10/2015 | Arnold | B60N 2/688 |
| | | | 297/469 |
| 2020/0010046 A1* | 1/2020 | Sugamata | B60R 22/201 |
| 2020/0079317 A1* | 3/2020 | Jaradi | B60R 22/1958 |
| 2023/0051418 A1 | 2/2023 | Kim et al. | |
| 2024/0092309 A1* | 3/2024 | Ramirez | B60R 22/03 |

FOREIGN PATENT DOCUMENTS

| | | | | |
|---|---|---|---|---|
| CN | 212950267 U | 4/2021 | | |
| CN | 114312505 A | 4/2022 | | |
| DE | 3631780 A1 | 4/1987 | | |
| DE | 102019124617 A1 * | 3/2020 | | B60R 22/18 |
| EP | 0675028 A1 | 10/1995 | | |
| EP | 1591327 A1 | 11/2005 | | |
| FR | 2886249 A1 | 12/2006 | | |
| GB | 2110522 A | 6/1983 | | |
| JP | 2005239091 A | 9/2005 | | |
| JP | 2009096233 A | 5/2009 | | |
| JP | 2012131359 A | 7/2012 | | |
| JP | 5364809 B2 | 12/2013 | | |
| JP | 2018034553 A | 3/2018 | | |
| KR | 19980012888 U | 6/1998 | | |
| KR | 200141846 Y1 * | 6/1999 | | |
| WO | 2010010640 A1 | 1/2010 | | |

* cited by examiner

SEATBELT ANCHOR MECHANISM

BACKGROUND

A vehicle may include a seatbelt assembly. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent to a seat of the vehicle. The webbing may extend continuously from the seatbelt retractor to the anchor. For example, one end of the webbing feeds into the seatbelt retractor, and the other end of the webbing is fixed to the anchor. It is contemplated that future regulatory and technology evolution may allow for safe and permissible use of seat assemblies that are selectively rotatable to different facing positions, and in such examples, the seatbelt assembly may be a seat integrated restraint (SIR) in which various components of the seatbelt assembly, e.g., the retractor and the anchor, are carried by the seat assembly to allow the seat assembly to be rotatable.

DETAILED DESCRIPTION

A seat system includes a seat having a seatback and a seat bottom extending in a seat-forward direction from the seatback. A seatbelt retractor is mounted to the seatback and an anchor is carried by the seat bottom and movable seat-rearward and seat-forward between a retracted position and an extended position. A seatbelt webbing extends from the seatbelt retractor and is attached to the anchor. An actuator is operatively coupled to the anchor to move the anchor between the retracted position and the extended position.

The seat system may include a lock operable to selectively retain the anchor in the retracted position. The lock may include a solenoid operated pin mechanism.

The seat system may include a track elongated seat-forward and seat-rearward, the anchor being moveably engaged with the track between the retracted position and the extended position. The seat bottom may include a frame and the track may be fixed to the frame of the seat bottom. The actuator may be supported by the track. The lock is operable to selectively lock the anchor relative to the track in the retracted position. The lock solenoid may be supported by the track.

A latch plate may be slidably disposed on the seatbelt webbing. A buckle may be attached to the seat bottom and operative to releasably engage the latch plate.

The seat system may include a computer having a processor and a memory storing instructions executable by the processor to activate the actuator to move the anchor from the retracted position to the extended position in response to determining that an occupant is seated in the seat.

The memory may store instructions executable by the processor to, after moving the anchor to the extended position, activate the actuator to return the anchor to the retracted position in response to determining that the latch plate is inserted into the buckle. The memory may store instructions executable by the processor to, after moving the anchor to the retracted position, activate the solenoid to lock the anchor in the retracted position. The seat system may include an occupancy sensor.

With reference to the Figures, where like numerals indicate like features throughout the several views, an example of a seat system having a seat integrated restraint system includes a seat 14 with a seatback 22 and a seat bottom 24 extending in a seat-forward FD direction from the seatback 22. A seatbelt retractor 18 is mounted to the seatback 22 and an anchor 20 is carried by the seat bottom 24. The anchor 20 is movable seat-rearward and seat-forward between a retracted position (i.e., a design position) and an extended position. A seatbelt webbing 32 extends from the seatbelt retractor 18 and is attached to the anchor 20. An actuator 50/70 is operatively coupled to the anchor 20 to move the anchor 20 between the retracted position and the extended position to present the webbing 32 to an occupant of the seat 14.

Figure 1A:
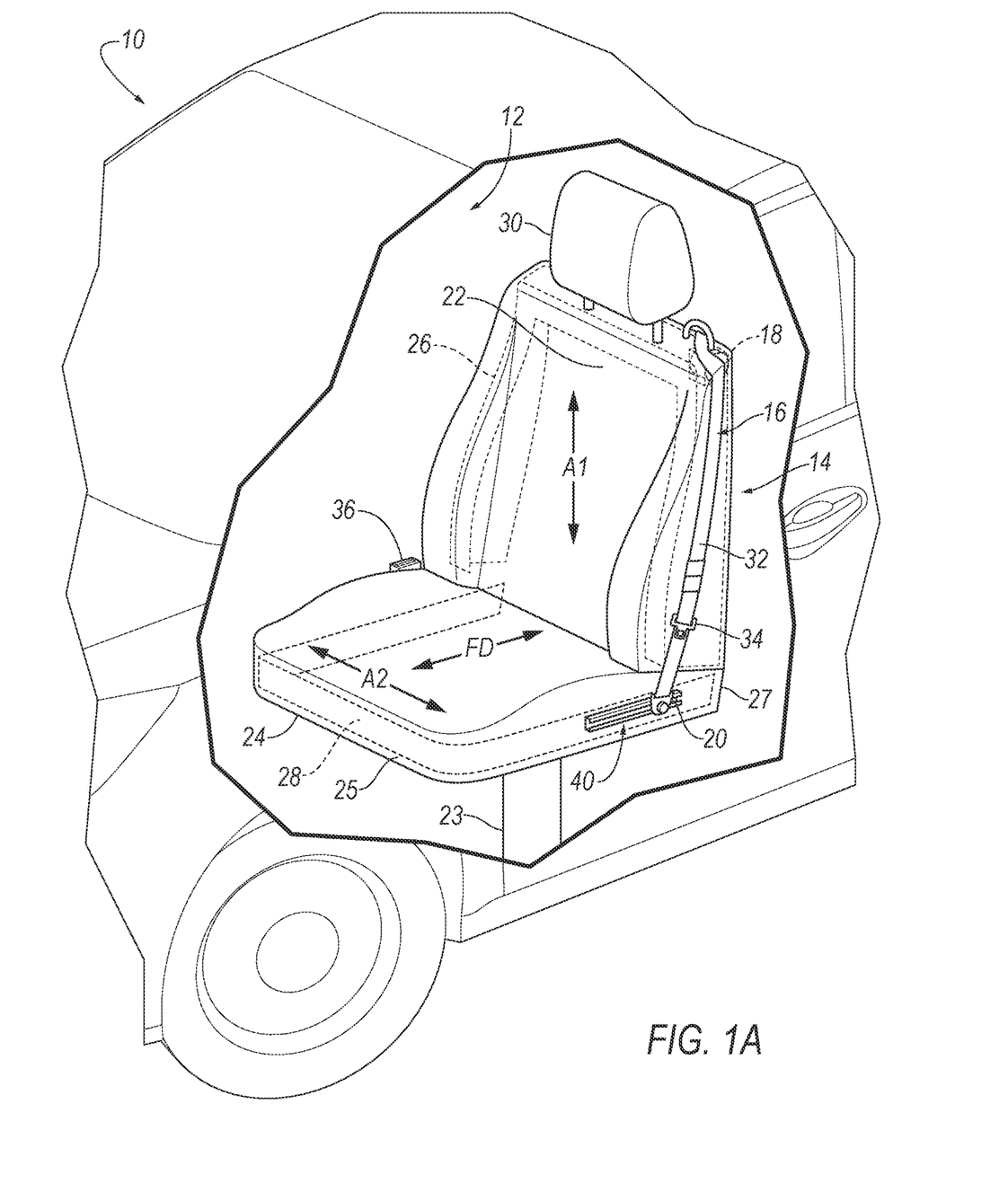
FIG. 1A is a perspective view of a portion of a vehicle with a seat assembly having a seatbelt anchor in a retracted position.
Figure 1B:
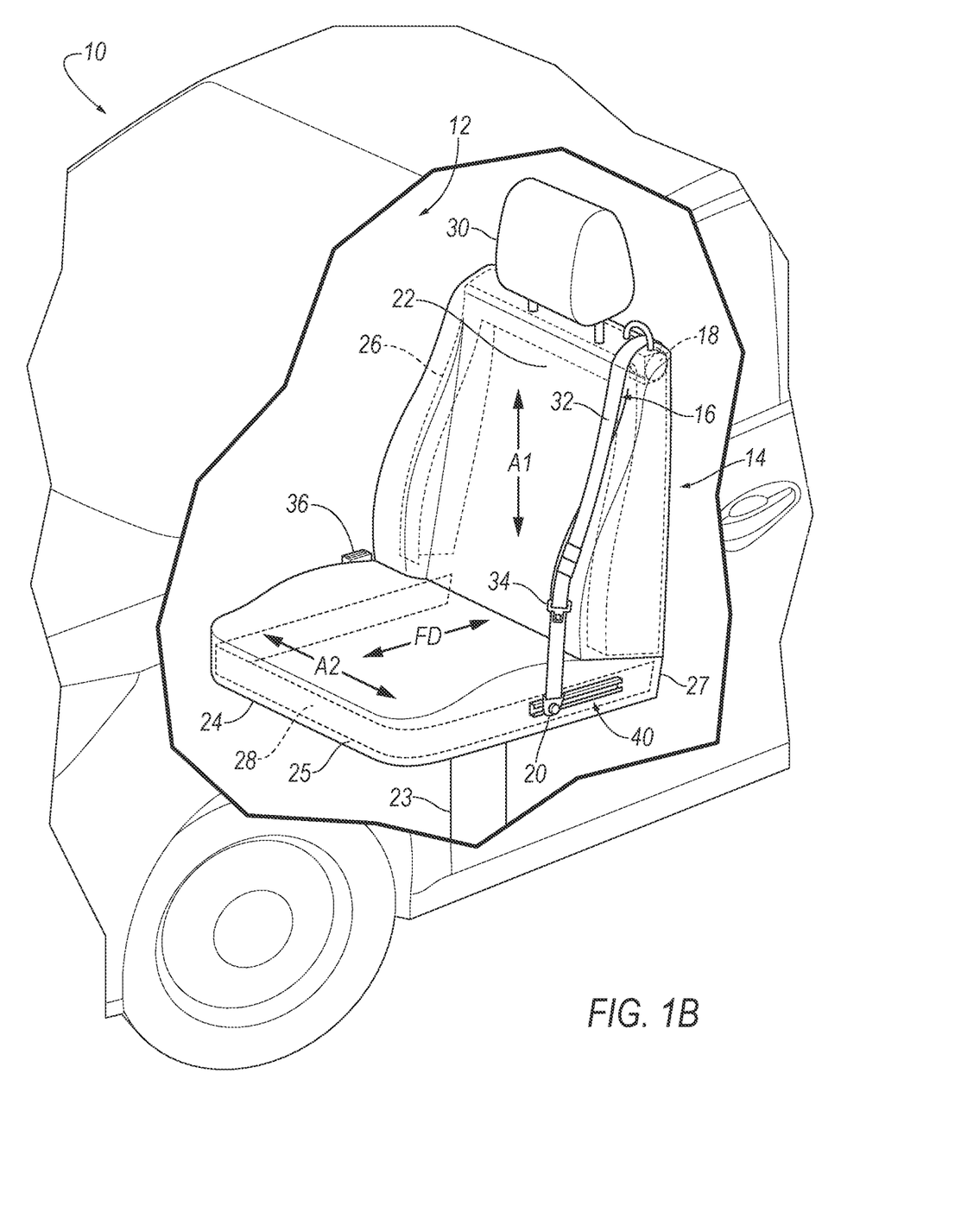
FIG. 1B is perspective view of the seat assembly having the seatbelt anchor in an extended position.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seat assemblies 14 may be supported in the passenger cabin 12, e.g., by a floor of the vehicle 10. It is contemplated that technology and the regulatory framework may evolve in the future to where use of rotatable seat assemblies becomes safe and permissible and, under such circumstances, the seat assemblies 14 may be rotatably supported by the floor to be selectively rotated to face in different directions of the passenger cabin 12, e.g., the front end, the rear end, the right side, the left side, etc. Only in such examples in which the future regulatory and technology evolution allows for safe and permissible use of seat assemblies 14 that are selectively rotatable to different facing positions, the seatbelt assembly 16 may be a SIR in which the components of the seatbelt assembly 16 are carried by the seat assembly 14. For example, the retractor 18 may be fixed to the seatback 22 and the anchor 20 may be carried by the seat bottom 24 of the seat assembly 14 such that the retractor 18 and the anchor 20 rotate with the seatback 22 and the seat bottom 24 as the seat assembly 14 is selectively rotated relative to the floor to face in different directions.

The seat assembly 14 may be supported via a pivot assembly 23 or other suitable structure that allows rotation of the seat assembly 14, including conventional structures. Each seat assembly 14 includes the seatback 22 and the seat bottom 24 that can support the occupant of the seat assembly 14. For example, the occupant of the seat assembly 14 may sit atop a top surface of the seat bottom 24 and recline against the seatback 22.

The seatback 22 may include a seatback frame 26. The seatback frame 26 may include tubes, beams, etc. Specifically, the seatback frame 26 may include a pair of upright frame members. The upright frame members are elongated, and specifically, are elongated in a generally upright direction (e.g., along the seat-vertical axis A1) when the seatback 22 is in a generally upright position. The upright frame members are spaced from each other along the seat-lateral axis A2. The seatback frame 26 may include one or more cross-members extending between the upright frame members.

The seat bottom 24 has a front end 25 and a rear end 27. The front end 25 is seat-forward of the rear end 27 in the seat-forward direction FD. The seat bottom 24 can include a seat bottom frame 28. The frame 28 may include tubes, beams, etc. Specifically, the seat bottom frame 28 may include a pair of frame members elongated in the seat-forward direction FD, e.g., between the front end 25 and the rear end 27 of the seat bottom 24. The frame members are spaced from each other along the seat-lateral axis A2. The frame 28 may include cross-members extending between the frame members. The cross-members may be elongated along the seat-lateral axis A2. The frame can include a seat pan. The seat pan may be generally planar and extend from one of the frame members to the other of the frame members, e.g., along seat-lateral axis A2. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24 at the rear end 27. The seat bottom 24 extends from the seatback 22 in the seat-forward direction FD of the seat assembly 14. The rear end 27 is proximate to the seatback 22 and the front end 25 is distal from the seatback 22. The seatback 22 may be stationary or movable relative to the seat bottom 24. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other.

The seat assembly 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other.

Each seat assembly 14 may include a seatbelt assembly 16. As set forth above, it is contemplated that future regulatory and technology evolution may allow for safe and permissible use of seat assemblies 14 that are selectively rotatable to different facing positions, and only in such examples, the seatbelt assembly 16 may be a SIR in which various components of the seatbelt assembly 16, e.g., the retractor 18 and the anchor 20, are carried by the seat assembly 14.

The seatbelt assembly 16 includes the retractor 18 and a webbing 32. The webbing 32 is retractably payable from the retractor 18. The seatbelt assembly 16 may include the anchor 20 fixed to the webbing 32 and a latch plate 34 that engages a buckle 36. The webbing 32 may extend continuously from the retractor 18 to the anchor 20. The latch plate 34 may slide freely along the webbing 32, and when engaged with the buckle 36, divide the webbing 32 into a lap belt and a shoulder belt. The webbing 32 may be fabric, e.g., polyester.

In examples in which the seatbelt assembly 16 is a SIR for a seat assembly 14 that is selectively rotatable to face different directions in examples in which contemplated future regulatory and technology evolution allows for such use, as described above, the retractor 18 may be supported by the seatback 22. In other words, in such examples, the weight of the retractor 18 is borne by the seatback 22, and more specifically the seatback frame 26. For example, the frame of the retractor 18 may be fixed to the frame 26 of the seatback 22 via weld, fastener, or other suitable structure. The retractor 18 may be supported by the seatback 22 at the top end as shown.

In the example in which the seatbelt assembly 16 is a SIR, as described above, the anchor 20 may be carried by a seatbelt anchor mechanism 40 fixed to e.g., the seat bottom frame 28. The seatbelt anchor mechanism 40 can assist the occupant of the seat assembly 14 when fastening the seatbelt assembly 16 by moving the anchor 20 in the seat-forward direction FD from a retracted position (FIG. 1A) to an extended position (FIG. 1B). When the anchor 20 is in the extended position, the webbing 32 and the latch plate 34 are moved away (seat-forward) from the seatback 22 to a location that may be more easily grasped by the occupant. Once the latch plate 34 is inserted into the buckle 36 the seatbelt anchor mechanism 40 returns the anchor 20 to the retracted position. The retracted position refers to the design position of the anchor 20.

Figure 2:
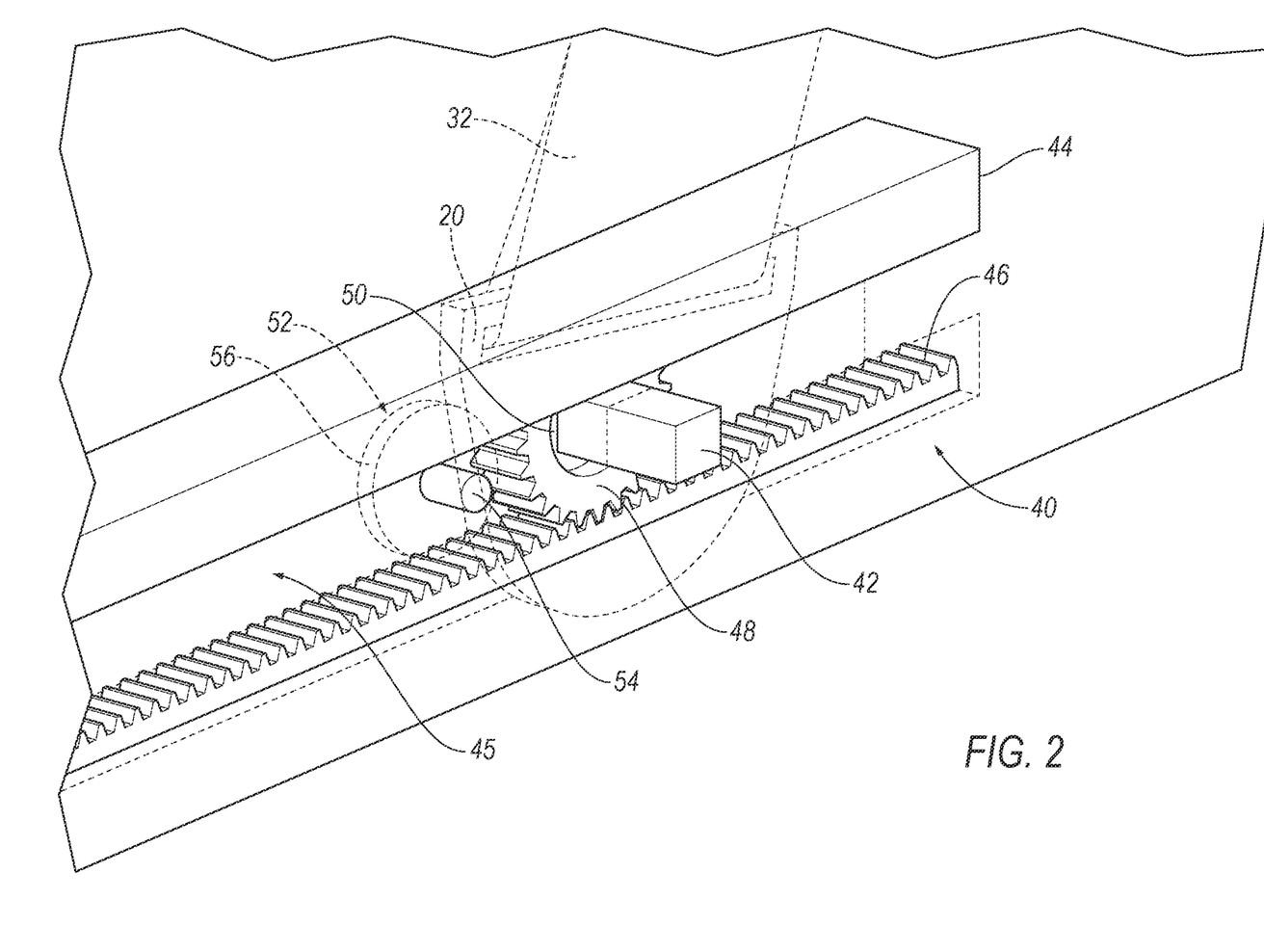
FIG. 2 is a magnified perspective view of a seatbelt anchor actuator including a rack and pinion.

With reference to FIG. 2, an example seatbelt anchor mechanism 40 incorporates a rack and pinion design. The seatbelt anchor mechanism 40 may include a C-shaped anchor track 44. The anchor track 44 is elongated seat-forward and seat-rearward and is attached to the seat bottom frame 28. The seatbelt anchor 20 is attached to an anchor carrier 42 and is moveably engaged with the track 44 between the retracted position and the extended position. In the depicted example, the anchor track 44 includes a gear rack 46 extending along a length of the track 44. A pinion gear 48 is disposed in the track 44 and engages the gear rack 46. The pinion gear 48 is mounted to the anchor carrier 42.

An actuator, such as motor 50, may be positioned in e.g., the pinion gear 48, as shown, or in the anchor carrier 42. The motor 50 is operative to rotate the pinion gear 48 such that it travels along the gear rack 46 to move the anchor 20 seat-rearward and seat-forward between the retracted position and the extended position. The anchor carrier 42 may have e.g., a rectangular cross-section to mate with a slot 45 formed along the length of the C-shaped anchor track 44. The rectangular cross-section slidably mates with the slot 45 to prevent the anchor carrier 42 from rotating with respect to the track 44 and pinion gear 48.

The seatbelt anchor mechanism 40 may include a lock 52 operable to selectively retain or lock the anchor 20 in the retracted position. The lock 52 may be a solenoid operated pin mechanism including a pin 54 that is operated by a solenoid 56. The solenoid 56 is operable to selectively extend and retract the pin 54. The solenoid 56 may be mounted to the track 44 with the pin 54 extendable into the path of the pinion gear 48. When the anchor 20 is in the retracted position, the solenoid 56 may be activated to extend the pin 54, thereby locking the anchor 20 in the retracted position.

Figure 3:
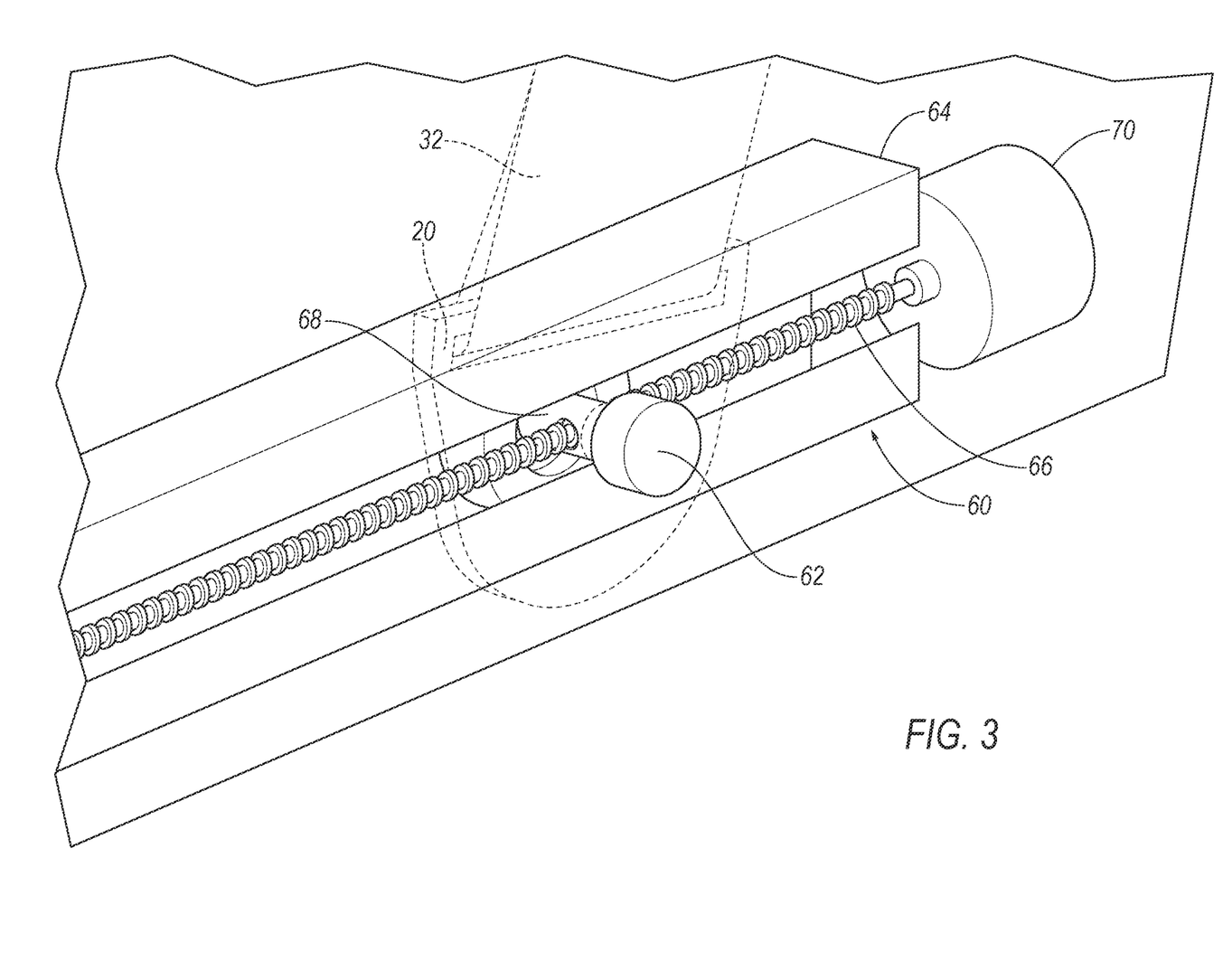
FIG. 3 is a magnified perspective view of a seatbelt anchor actuator including a lead screw drive.

FIG. 3 illustrates another example seatbelt anchor mechanism 60. The seatbelt anchor mechanism 60 incorporates a lead screw design. The seatbelt anchor mechanism 60 may include a C-shaped anchor track 64. The anchor track 64 is elongated seat-forward and seat-rearward and is attached to the seat bottom frame 28. The seatbelt anchor 20 is attached to an anchor carrier 62 and is moveably engaged with the track 64 between the retracted position and the extended position. In the depicted example, the anchor track 64 houses a lead screw 66 extending along a length of the track 64. The anchor carrier 62 includes a threaded nut portion 68 configured to threadedly engage the lead screw 66.

An actuator, such as motor 70, may be supported by the anchor track 64. The motor 70 is operative to rotate the lead screw 66 such that the anchor carrier 62 travels along the lead screw 66 to move the anchor 20 seat-rearward and seat-forward between the retracted position and the extended position. The seatbelt anchor mechanism 60 may include a suitable lock mechanism, such as lock 52 described above with respect to seatbelt anchor mechanism 40 shown in FIG. 2.

Figure 4:
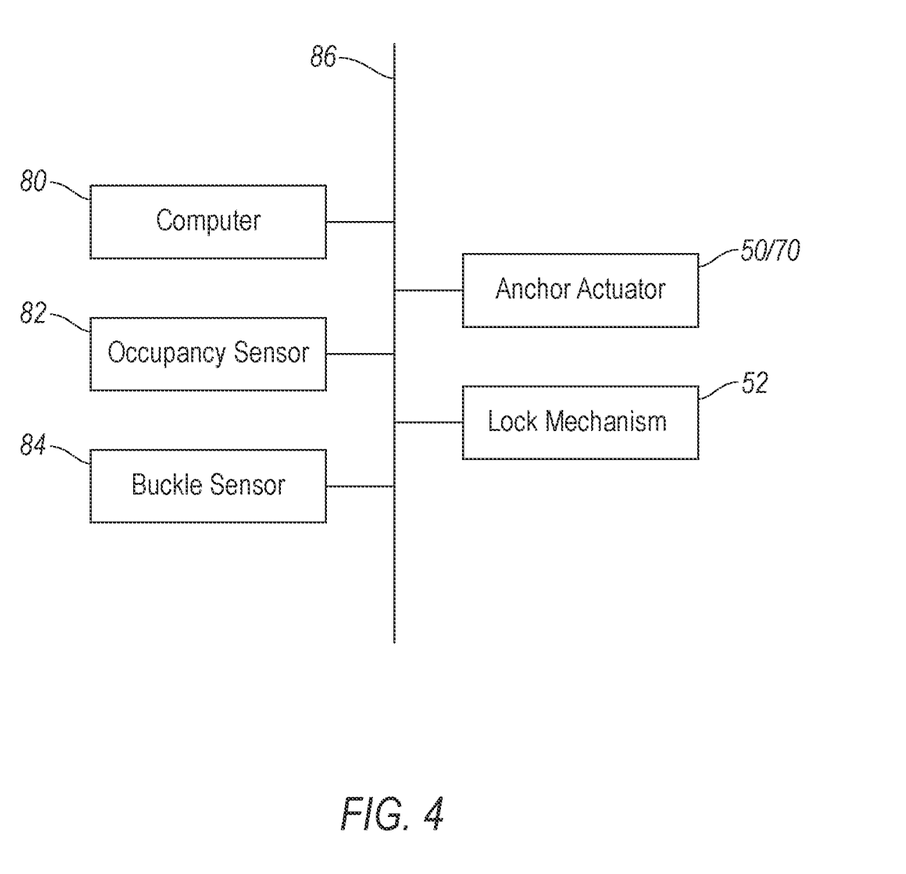
FIG. 4 is a block diagram of a system of the vehicle.

With reference to FIG. 4, a seat system can include the seat assembly 14, the seatbelt assembly 16 (including the seatbelt anchor mechanism 40/60), as well as a computer 80, a network 86, and various sensors, including an occupancy sensor 82 and a buckle sensor 84. The vehicle 10 may include an occupancy sensor 82 configured to detect occupancy of the seat assembly 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat assembly 14 is occupied or unoccupied.

The vehicle 10 may include a buckle sensor 84 that detects engagement of the latch plate 34 of the seatbelt assembly 16 with the buckle 36. The buckle sensor 84 may include a switch, a contact sensor, a hall effect sensor, or any other suitable structure for detecting engagement of the latch plate 34 with the buckle 36, including conventional structures. The buckle sensor 84 provides data to the computer 80 indicating whether the latch plate 34 is engaged with, or disengaged from, the buckle 36.

The vehicle 10 may include a communication network 86. The communication network 86 includes hardware, such as a communication bus, for facilitating communication among vehicle 10 components, e.g., the computer 80, the occupancy sensor 82, the buckle sensor 84, the anchor actuator 50/70, the lock mechanism 52, etc. The communication network 86 may facilitate wired or wireless communication among the vehicle 10 components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 86 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to, command the anchor actuator 50/70 to move the anchor 20 from the retracted position to the extended position, and to move the anchor 20 from the extended position to the retracted position. The computer 80 may move the anchor 20 by transmitting a command to the anchor actuator 50/70 via the communication network 86. The command may specify the retracted position or the extended position.

The computer 80 may be programmed to move the anchor 20 to the extended position in response to detecting that the seat assembly 14 is occupied. The computer 80 may determine that the seat assembly 14 is occupied based on information received from the occupancy sensor 82 via the communication network 86. For example, upon receiving information from the occupancy sensor 82 indicating that the seat assembly 14 has gone from being unoccupied to being occupied, the computer 80 may transmit a command to the anchor actuator 50/70 specifying movement of the anchor 20 to the extended position. The computer 80 may transmit a command to the lock mechanism 52 to retract the locking pin 54 prior to commanding movement of the anchor 20.

The computer 80 may be programmed to move the anchor 20 to the retracted position in response to detecting that the latch plate 34 is engaged with the buckle 36 of the seat assembly 14. The computer 80 may determine that the latch plate 34 is engaged with the buckle 36 based on information received from the buckle sensor 84 via the communication network 86. For example, upon receiving information from the buckle sensor 84 indicating that the latch plate 34 has gone from being disengaged from the buckle 36 to engaged with the buckle 36, the computer 80 may transmit a command to the anchor actuator 50/70 specifying movement of the anchor 20 to the retracted position. Once the anchor 20 is moved to the retracted position the computer 80 may transmit a command to the lock mechanism 52 to extend the locking pin 54. The computer 80 may be programmed to confirm that the anchor 20 is in the retracted position (i.e., design position). In the event the computer 80 determines that the anchor 20 is not in the retracted position, the computer 80 may activate audio and/or visual indicators, for example.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adjectives first, second, etc., are used throughout this document as identifiers and, unless explicitly stated otherwise, are not intended to signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat system, comprising:
   a seat including a seatback and a seat bottom extending in a seat-forward direction from the seatback;
   a seatbelt retractor mounted to the seatback;
   an anchor carried by the seat bottom and movable seat-rearward and seat-forward between a retracted position and an extended position;
   a seatbelt webbing extending from the seatbelt retractor and attached to the anchor;
   an actuator operatively coupled to the anchor to move the anchor between the retracted position and the extended position; and
   a track elongated seat-forward and seat-rearward, the anchor being moveably engaged with the track between the retracted position and the extended position;
   the actuator being supported by the track;
   a gear rack extending along the track and a pinion gear disposed in the track and engaged with the gear rack, the actuator being operative to rotate the pinion gear;
   a lock operable to selectively retain the anchor in the retracted position;
   the lock including a solenoid operated pin mechanism including a solenoid and a pin extending from the solenoid into the track into a path of the pinion gear.

2. The seat system of claim 1, wherein the lock is operable to selectively lock the anchor relative to the track in the retracted position.

3. The seat system of claim 2, wherein the operated pin mechanism is supported by the track.

4. The seat system of claim 1, wherein the seat bottom includes a frame and the track is fixed to the frame of the seat bottom.

5. The seat system of claim 1, further comprising a latch plate slidably disposed on the seatbelt webbing.

6. The seat system of claim 5, further comprising a buckle attached to the seat bottom and operative to releasably engage the latch plate.

7. The seat system of claim 1, further comprising a computer having a processor and a memory storing instructions executable by the processor to activate the actuator to move the anchor from the retracted position to the extended position in response to determining that an occupant is seated in the seat.

8. The seat system of claim 7, further comprising a latch plate slidably disposed on the seatbelt webbing and a buckle attached to the seat bottom and operative to releasably engage the latch plate.

9. The seat system of claim 8, wherein the memory stores instructions executable by the processor to, after moving the anchor to the extended position, activate the actuator to return the anchor to the retracted position in response to determining that the latch plate is inserted into the buckle.

10. The seat system of claim 9, wherein the memory stores instructions executable by the processor to, after moving the anchor to the retracted position, activate the solenoid to lock the anchor in the retracted position.

11. The seat system of claim 7, further comprising an occupancy sensor.

* * * * *

UNITED STATES PATENT AND TRADEMARK OFFICE
CERTIFICATE OF CORRECTION

PATENT NO. : 12,296,785 B2
APPLICATION NO. : 18/451231
DATED : May 13, 2025
INVENTOR(S) : Dean M. Jaradi et al.

Page 1 of 1

It is certified that error appears in the above-identified patent and that said Letters Patent is hereby corrected as shown below:

In the Claims

Column 8, Line 19, Claim 3:
Insert --solenoid--.

Signed and Sealed this
Twenty-fourth Day of June, 2025

Coke Morgan Stewart
*Acting Director of the United States Patent and Trademark Office*